US009975547B2

(12) United States Patent
Myers et al.

(10) Patent No.: US 9,975,547 B2
(45) Date of Patent: May 22, 2018

(54) METHODS AND SYSTEMS FOR AUTOMATICALLY DETECTING AND RESPONDING TO DANGEROUS ROAD CONDITIONS

(71) Applicant: Ford Global Technologies, LLC, Dearborn, MI (US)

(72) Inventors: Scott Vincent Myers, Camarillo, CA (US); Sneha Kadetotad, Cupertino, CA (US); Ashley Elizabeth Micks, Mountain View, CA (US); Harpreetsingh Banvait, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/227,625

(22) Filed: Aug. 3, 2016

(65) Prior Publication Data
US 2018/0037221 A1 Feb. 8, 2018

(51) Int. Cl.
*B60W 30/02* (2012.01)
*B60W 30/14* (2006.01)
*B60W 40/076* (2012.01)
*G08G 1/0967* (2006.01)

(52) U.S. Cl.
CPC .......... *B60W 30/02* (2013.01); *B60W 30/143* (2013.01); *B60W 40/076* (2013.01); *G08G 1/096775* (2013.01); *B60W 2420/42* (2013.01); *B60W 2420/52* (2013.01); *B60W 2550/12* (2013.01); *B60W 2550/14* (2013.01); *B60W 2720/10* (2013.01)

(58) Field of Classification Search
CPC ................... B60W 30/02; G08G 1/09
See application file for complete search history.

(56) References Cited

U.S. PATENT DOCUMENTS

| 4,274,091 | A | | 6/1981 | Decker | |
|---|---|---|---|---|---|
| 5,416,476 | A | | 5/1995 | Rendon | |
| 5,838,239 | A | * | 11/1998 | Stern | B64D 15/20 340/583 |
| 6,169,495 | B1 | * | 1/2001 | Koike | B61L 27/0016 340/435 |
| 6,328,467 | B1 | * | 12/2001 | Keyhani | B64D 15/20 374/16 |

(Continued)

FOREIGN PATENT DOCUMENTS

DE 3640539 A1 6/1988

OTHER PUBLICATIONS

Ice detector warns drivers in advance: Technology makes driving on black ice safer, Jan. 23, 2013, http://phys.org/news/20130licedetectordriversadvancetechnology.html.

*Primary Examiner* — Alex C Dunn
(74) *Attorney, Agent, or Firm* — David R. Stevens; Stevens Law Group (57) ABSTRACT

A method for automatically detecting and safely traversing an accumulation of ice on an impending bridge. The method automatically identifies, by the vehicle, impending approach of the vehicle to a bridge and senses an accumulation of ice on the bridge. The method then calculates a speed of the vehicle needed to prevent longitudinal slip between the vehicle and the bridge, and automatically slows the vehicle at a rate sufficient to enable the vehicle to reach the calculated speed by the time it reaches the bridge. A corresponding system is also disclosed and claimed herein.

20 Claims, 5 Drawing Sheets

(56) References Cited

U.S. PATENT DOCUMENTS

| | | | | |
|---|---|---|---|---|
| 6,470,303 B2* | 10/2002 | Kidd | G06Q 99/00 | 702/33 |
| 6,753,766 B2* | 6/2004 | Patchell | B60Q 9/008 | 340/436 |
| 6,840,342 B1* | 1/2005 | Hahn | B60R 1/00 | 180/169 |
| 7,253,724 B2* | 8/2007 | Prakah-Asante | B60Q 9/008 | 340/439 |
| 7,561,951 B2* | 7/2009 | Rao | B60W 50/0205 | 180/268 |
| 2002/0075141 A1 | 6/2002 | Lang | | |
| 2002/0156588 A1* | 10/2002 | Arndt | G06F 19/20 | 702/20 |
| 2005/0167593 A1 | 8/2005 | Forsyth | | |
| 2005/0187701 A1* | 8/2005 | Baney | G08G 1/096716 | 701/117 |
| 2005/0263646 A1* | 12/2005 | Nichols | B64F 5/20 | 244/134 F |
| 2007/0063824 A1* | 3/2007 | Gaddy | G08G 1/096783 | 340/426.21 |
| 2008/0129541 A1 | 6/2008 | Lu | | |
| 2009/0024336 A1* | 1/2009 | Tatom | G01G 23/3728 | 702/56 |
| 2015/0120092 A1* | 4/2015 | Renno | B64D 15/20 | 701/3 |
| 2015/0120093 A1* | 4/2015 | Renno | G01N 21/3554 | 701/3 |
| 2015/0179069 A1* | 6/2015 | Cazanas | G08G 1/096775 | 340/905 |
| 2015/0274159 A1* | 10/2015 | Lu | B60T 8/171 | 701/82 |
| 2015/0353088 A1 | 12/2015 | Ishikawa | | |
| 2015/0364041 A1* | 12/2015 | Mohtashami | G08G 1/096783 | 702/166 |

* cited by examiner

METHODS AND SYSTEMS FOR AUTOMATICALLY DETECTING AND RESPONDING TO DANGEROUS ROAD CONDITIONS

BACKGROUND

Field of the Invention

This invention relates to systems and methods for automatically detecting and safely traversing an icy bridge.

Background of the Invention

Extremely dangerous road conditions can occur when snow, ice and water accumulate on bridges and overpasses. Bridges and overpasses are particularly susceptible to these conditions because, unlike normal road surfaces, they are exposed to freezing temperatures and wind on top of the road surface, underneath the road surface, and on both sides. In addition, bridges are often constructed over bodies of water, which cool faster than solid ground. Finally, unlike roads, bridges are usually constructed of steel and concrete, which conduct heat very well. Any heat a bridge traps will be transferred to its surface quickly, where it will be lost to the surrounding air.

These factors combine to create very dangerous situations for vehicles traveling at normal highway speeds during cold weather. Cold temperatures cause bridges and overpasses to cool and accumulate snow and ice faster than other road surfaces, causing rapid and unexpected transitions between regular road surfaces and dangerous, icy terrain.

For example, it is not unusual for bridges and overpasses to be completely covered with a layer of slick snow and ice, even though connecting road surfaces are clear or just slightly wet. This is because the ground below roads helps to trap in heat and keep roads from getting icy unless the temperature drops several degrees below freezing. Successfully transitioning a vehicle from a clear road onto and over an icy bridge requires early detection and an immediate response, even before the vehicle actually encounters the bridge. Traveling speed must be substantially reduced and driving techniques must be altered to account for the slippery conditions. Failure to make either of these adjustments appropriately may result in catastrophe.

In view of the foregoing, what are needed are systems and methods to identify potentially icy bridges and overpasses within a vehicle's geographical area. Ideally, such systems and methods would automatically detect an accumulation of ice or snow on a bridge as the vehicle approaches, and automatically adjust the vehicle's driving speed as needed to prevent slipping or skidding.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
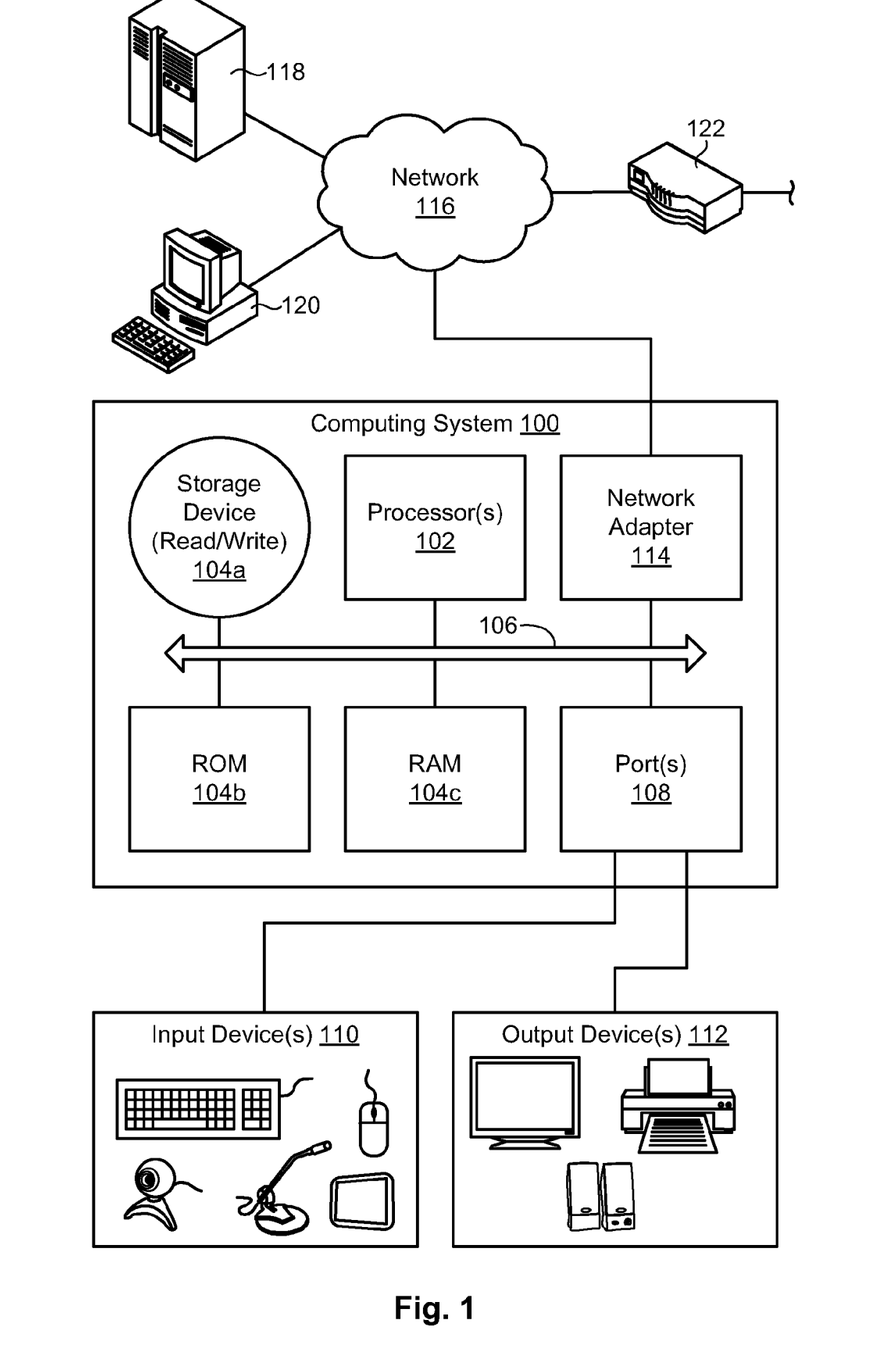
FIG. 1 is a high-level block diagram showing one example of a computing system in which a system and method in accordance with the invention may be implemented.

Referring to FIG. 1, one example of a computing system 100 is illustrated. The computing system 100 is presented to show one example of an environment where a system and method in accordance with the invention may be implemented. The computing system 100 may be embodied as a mobile device 100 such as a smart phone or tablet, a desktop computer, a workstation, a server, or the like. The computing system 100 is presented by way of example and is not intended to be limiting. Indeed, the systems and methods disclosed herein may be applicable to a wide variety of different computing systems in addition to the computing system 100 shown. The systems and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a wired or wireless network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

As previously mentioned, some of the most dangerous types of driving conditions occur when snow and ice accumulate on bridges and overpasses. Vehicles traveling a route from a grounded roadway surface onto a bridge are particularly vulnerable to accidents since there is often no indication or forewarning of danger prior to the transition from road to bridge. To avoid this type of catastrophe, vehicles in accordance with embodiments of the present invention may be configured to anticipate icy bridges and take preventative steps to avoid slipping or skidding when encountering such a transition.

Figure 2:
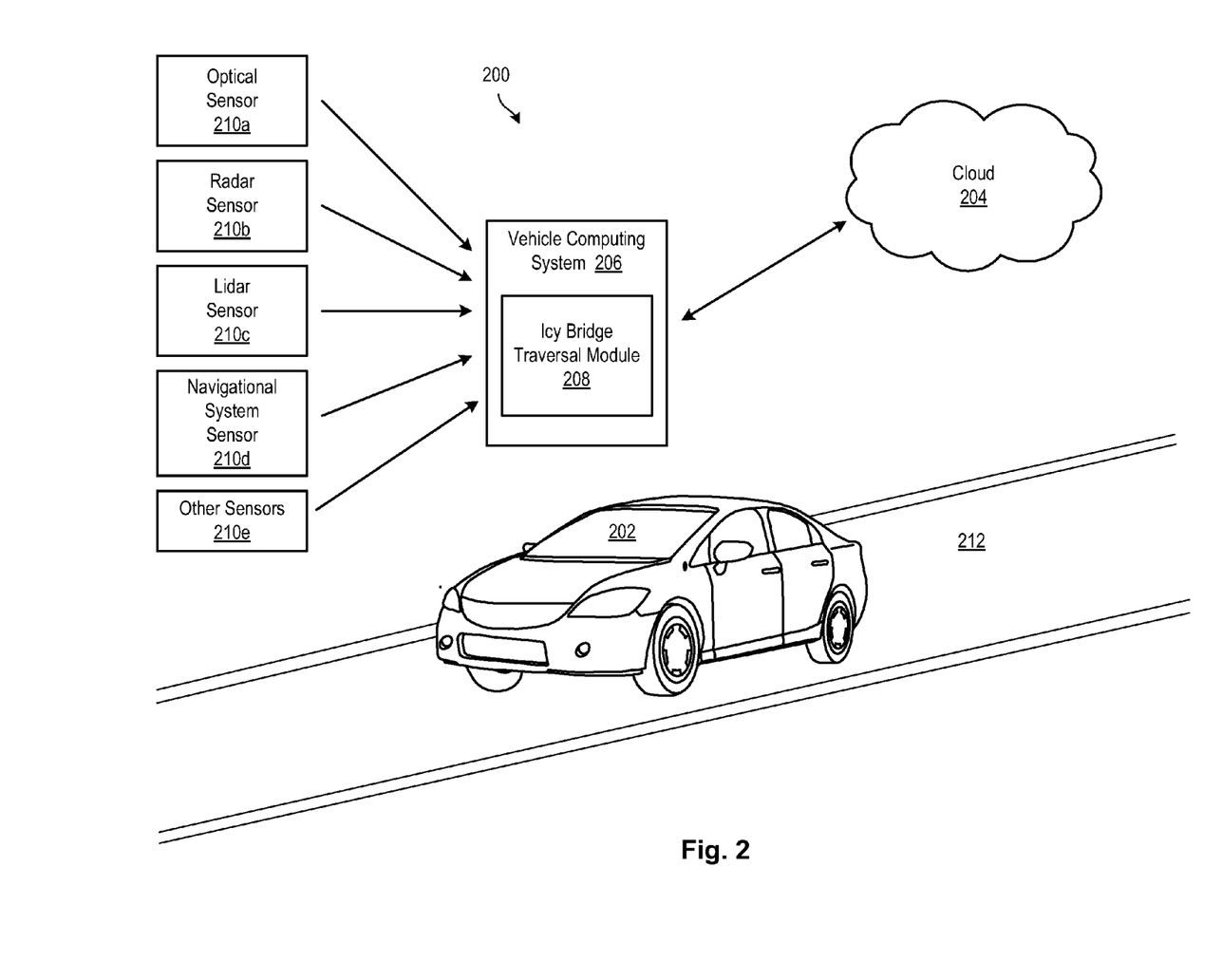
FIG. 2 is a perspective view of one embodiment of a vehicle utilizing vehicle-mounted sensors to detect and safely traverse an icy bridge in accordance with the invention.

Referring to FIG. 2, in certain embodiments, a system 200 in accordance with the invention may include a vehicle 202 in transit along a roadway surface 212. The vehicle 202 may include a passenger vehicle, an autonomous vehicle, a heavy duty industrial or transport vehicle, a bus, or the like. The vehicle 202 may be equipped with various on-board sensors 210a-e configured to sense an external environment. These sensors 210a-e may include, for example, optical or camera sensors 210a, radar sensors 210b, Lidar sensors 210c, and navigational system sensors 210d. Other sensors 210e may include, for example, temperature sensors, humidity sensors, wheel revolution sensors, axle rotation sensors, pressure sensors, friction sensors, and the like. In some embodiments, as discussed in more detail below, certain sensors 210a-e may communicate with a cloud 204 server or other external data sources to obtain map data or other relevant information.

As discussed in more detail below, these sensors 210a-e may work together to sense conditions of the surrounding environment to determine whether the vehicle 202 is approaching a dangerous accumulation of ice or snow on an impending bridge. A vehicle 202 in accordance with embodiments of the invention may also include an internal vehicle computing system 206 to analyze and apply the sensory data gathered from the sensors 210a-e to make this determination and determine an appropriate course of action.

In certain embodiments, the vehicle computing system 206 may include an icy bridge traversal module 208. Using the data from the sensors 210a-e, the icy bridge traversal module 208 may be configured to detect hazardous road conditions due to an accumulation of ice or snow on an impending bridge, and take appropriate actions to prevent the vehicle 202 from slipping.

In particular, the icy bridge traversal module 208 may be configured to collect data output from each of the sensors 210a-e and perform one or more fusion algorithms, using the data from the sensors 210a-e as input. The fusion algorithms may generate a confidence score indicating both the existence of an impending bridge, and the likelihood that ice or snow has accumulated on it. As discussed in more detail below, the confidence score may trigger performance of subsequent calculations regarding vehicle 202 speed and longitudinal slip, and may further trigger an associated reduction in vehicle 202 speed to avoid slippage. In this manner, embodiments of the present invention may facilitate successful navigation of a vehicle 202 over an icy bridge.

In some embodiments, vehicle 202 sensors 210a-e may be configured to gather external data indicating both the presence of an impending bridge, as well as probable ice formation on the bridge or overpass. For example, in certain embodiments optical sensors 210a may include image acquisition devices such as cameras, charge coupled devices, or the like, to acquire still images or video of the surrounding area. Optical sensors 210a may communicate with the vehicle computing system 206 to perform processing on acquired images to increase contrast or clarity, for example. Data from the optical sensors 210a may be gathered, processed, and analyzed by the vehicle computing system 206 to indicate or confirm the presence of an impending bridge and/or an accumulation of snow or ice on the bridge.

Radar sensors 210b coupled to the vehicle 202 may use electromagnetic waves to determine the distance between the vehicle 202 and a bridge or overpass, or between a dry roadway surface 212 and an accumulation of snow or ice on a roadway surface 212. Radar sensors 210b may also be used to determine properties of a bridge or a condition of the bridge.

For example, data gathered from radar sensors 210b may be used to distinguish between different types of bridges, such as a girder bridges, truss bridges, arch bridges, cantilever bridges, cable-stayed bridges, suspension bridges, and highway overpasses. As different types of bridges present different navigational difficulties due to variances in slope, construction materials, and characteristic features, this data may be useful in determining an appropriate response for successfully traversing the bridge under hazardous snow and ice conditions. Data gathered from radar sensors 210b may also be used to identify a type of roadway surface 212, or to detect a change in roadway surface 212, as may be expected when transitioning from a grounded road to a bridge, or from a dry roadway surface 212 to a wet or icy roadway surface 212. As discussed above, this data may be communicated to the vehicle computing system 206 and used to detect an accumulation of snow or ice on a bridge, and to facilitate an appropriate response by the vehicle 202.

Lidar (Light Detection and Ranging) sensors 210c coupled to the vehicle 202 may be used to gather data by scanning the surrounding environment, including the roadway surface 212, with a laser light. In this manner, Lidar sensors 210c may determine the exact location of a bridge as well as its relevant features and characteristics, including its slope or grade relative to the roadway surface 212. Lidar sensors 210c may also sense other vehicles and environmental objects and conditions, such as traffic congestion or accidents. This data may also be received by the vehicle computing system 206 and imputed into fusion algorithms to determine an appropriate vehicle 202 response.

Navigational system sensors 210d may be used to detect a location of the vehicle 202. This location may be used to retrieve map data for areas in which the vehicle 202 is located. The map data may be stored by the vehicle 202, or retrieved from an external source such as a cloud 204 server. This map data may include the locations of nearby bridges so that the vehicle computing system 206 can determine whether a bridge is being approached. In some embodiments, the map data may include information about the terrain or roadway surface 212 being traversed by the vehicle 202, such as the slope or grade of the road being traversed, the width of the road or an upcoming bridge, the elevation of the road or upcoming bridge, the type of bridge being traversed, curves in the road and recommended speeds associated with the curves, or the like.

By comparing the location of the vehicle 202 to the location of a bridge, as well as identifying the route traveled by the vehicle 202 to the bridge, the distance to the bridge may be determined. The navigational system sensors 210d may include common global positioning system ("GPS") sensors, or other similar sensors known in the art. In certain embodiments, knowledge of the location of the vehicle 202 may also be useful to retrieve other types of data such as current or past weather data, current road conditions, traffic data, accident and road hazard data, and the like, for areas traversed by the vehicle 202.

Figure 3:
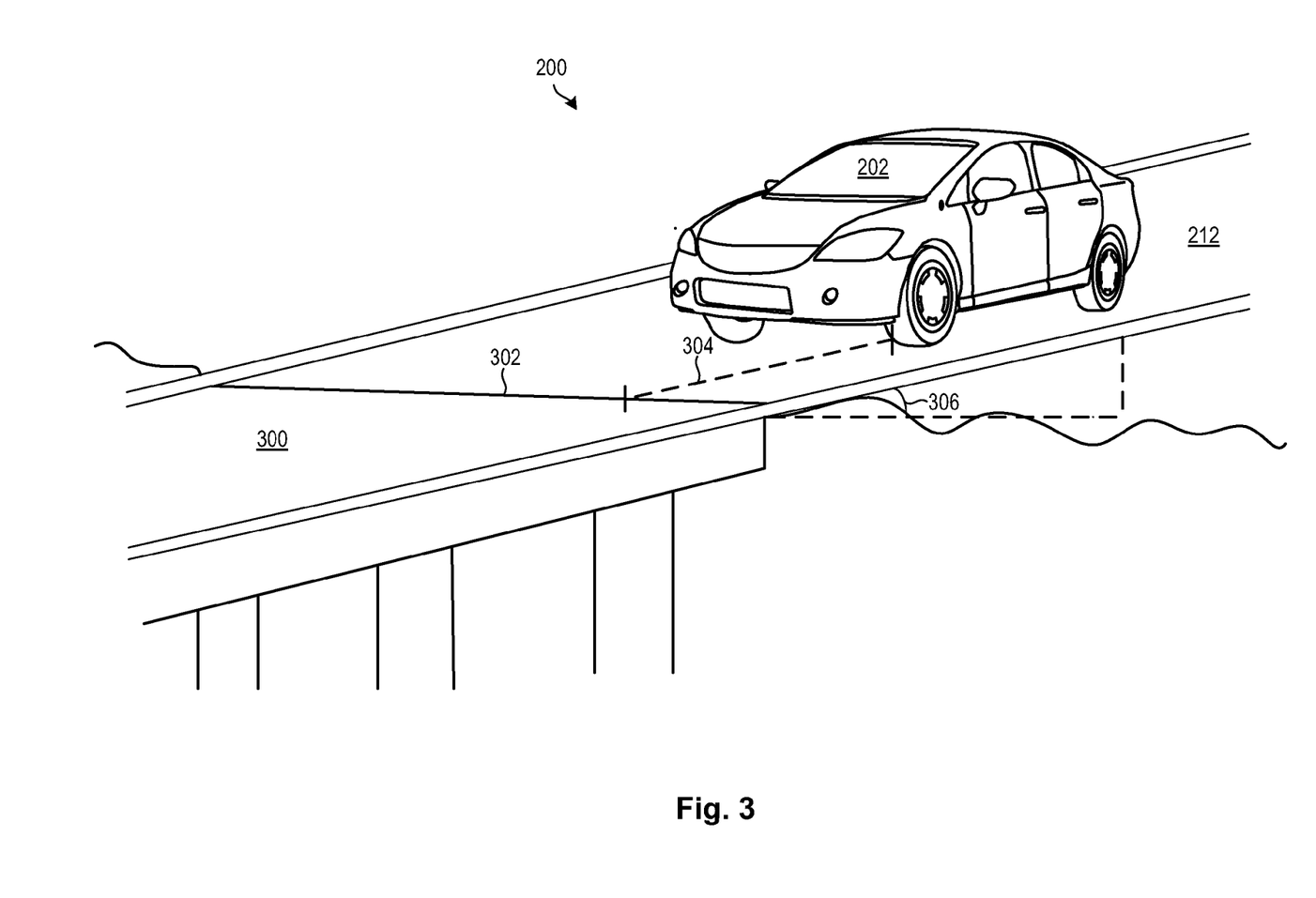
FIG. 3 is a perspective view of a vehicle approaching an icy bridge in accordance with certain embodiments of the invention.

Referring now to FIG. 3, upon approaching a bridge 300, various factors may be considered when determining a desired speed of the vehicle 202 as it passes over the bridge 300. For example, a distance 304 between the vehicle 202 and the bridge 300 may dictate how fast the vehicle 202 needs to decelerate to reach the desired speed by the time it reaches the bridge 300. A slope 306 of a grade leading up to the bridge 300 may dictate how fast the vehicle 202 can decelerate without causing the vehicle 202 to slip or slide relative to the roadway surface 212. Thus, the distance 304 and slope 306 may be used by the vehicle computing system 206 to determine the safest way to reduce the speed of the vehicle 202 to the desired speed by the time the vehicle 202 reaches the bridge 300.

In operation, in one embodiment, data gathered from various on-board vehicle 202 sensors 210a-e may undergo processing in the vehicle computing system 206 to indicate an impending bridge 300. Navigational system sensors 210d associated with the vehicle 202 may identify the location of the vehicle 202, which may then be used to retrieve associated current or historical weather data and/or road conditions. Radar sensors 210b and Lidar sensors 210c may gather data indicating a present accumulation of snow or ice on the bridge 300, which may be confirmed by optical data from optical sensors 210a. Other sensors 210e such as temperature and humidity sensors, may gather current environmental data indicating conditions favorable to the formation of ice on roadway surfaces 212. Data from the sensors 210a-e may be received by the vehicle computing system 206 and input into fusion algorithms to generate a confidence score of the existence of an icy bridge 300.

The confidence score generated by the vehicle computing system 206 may be compared to a predetermined threshold value, above which the presence of an accumulation of ice or snow on the bridge 300 is substantially certain. If the confidence score is greater than the predetermined threshold value, the vehicle computing system 206 may reduce a speed of the vehicle 202 and adjust other driving parameters as needed to facilitate safe navigation of the vehicle 202 over the bridge 300 and prevent slippage.

As previously mentioned, the vehicle computing system 206 may utilize data from the on-board sensors 210a-e to determine a distance 304 between the vehicle 202 and the transition 302 to the bridge 300. In some embodiments, a slope 306 of the roadway surface 212 relative to the bridge 300 may also be calculated. The vehicle computing system 206 may utilize this data to determine the greatest speed at which the vehicle 202 may successfully traverse the transition 302 and navigate the bridge 300. The vehicle computing system 206 may then reduce the vehicle 202 speed at a rate sufficient to enable the vehicle 202 to reach the calculated speed by the time it reaches the bridge 300.

Figure 4:
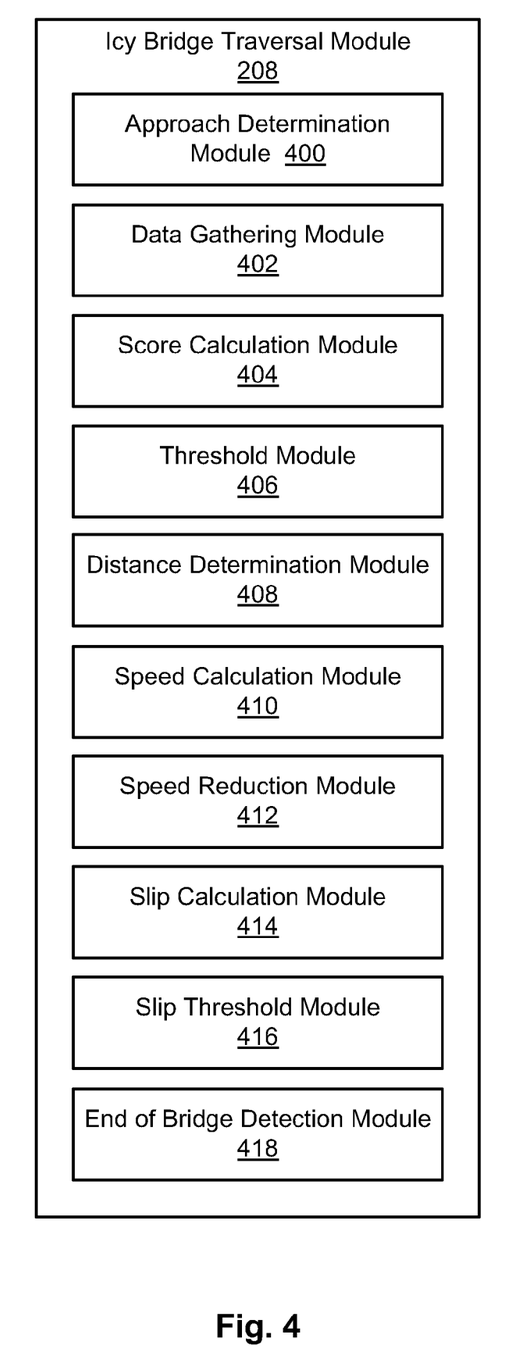
FIG. 4 shows modules for providing various features and functions of a system in accordance with certain embodiments of the invention.

Referring now to FIG. 4, a system in accordance with the invention may include various modules to provide different features and functions. The functionality of these modules may be implemented in one or more of the vehicle computing system 206, cloud server 204, or other external data sources. The modules may include one or more of an icy bridge traversal module 208, an approach determination module 400, a data gathering module 402, a score calculation module 404, a threshold module 406, a distance determination module 408, a speed calculation module 410, a speed reduction module 412, a slip calculation module 414, a slip threshold module 416, and an end of bridge detection module 418. These modules may be implemented in hardware, software, firmware, or combinations thereof. The modules are presented by way of example and are not intended to represent an exhaustive list of modules that may be included within the system. The system may include more or fewer modules than those illustrated, or the functionality of the modules may be organized differently.

Generally, the icy bridge traversal module 208 receives data from the on-board vehicle 202 sensors 210a-e, which may be used to determine impending approach of a vehicle 202 to a bridge 300, and to instigate a course of action to facilitate successful traversal of the bridge 300 by the vehicle 202. The icy bridge traversal module 208 may include one or more sub-modules to perform certain defined tasks in this regard, as set forth in detail below.

The approach determination module 400 may determine whether the vehicle 202 is approaching a bridge 300 or overpass. As discussed above, data may be gathered from various on-board sensors 210a-e and input into the approach determination module 400 to make this assessment. For example, navigational system sensors 210d may gather map data showing one or more bridges 300 located within the same geographic area as the vehicle 202. Radar sensors 210b and Lidar sensors 210c may collect data indicating an upcoming transition 302 from a grounded roadway surface 212 to a bridge 300, while optical sensors 210a may provide image data confirming the transition 302.

The data gathering module 402 may gather additional data from the on-board sensors 210a-e indicating an accumulation of snow or ice on the bridge 300. For example, optical sensors 210a may produce image data showing a reflective, glossy, or opaque white surface which, in some embodiments, may be made more visible by contrast processing performed by the vehicle computing system 206. Radar sensors 210b and Lidar sensors 210c may also gather data indicating an accumulation of ice or snow on the bridge 300. Navigational system sensors 210d may gather location information for the vehicle 202, which may be used to retrieve current and/or historical weather or temperature data for the bridge 300, indicating a likelihood of snow or ice accumulation thereon.

The combined data from the data gathering module 402 may be input into the score calculation module 404 to produce a confidence score reflecting a likelihood of snow or ice accumulation on the bridge 300. The threshold module 406 may then compare the confidence score to a predetermined threshold value or score, above which the existence of an icy bridge 300 is substantially certain. If the confidence score is equal to or greater than the threshold value, the vehicle computing system 206 may reduce the vehicle 202 speed and/or adjust driving parameters to prevent catastrophe, as detailed below.

Upon return of a confidence score exceeding the predetermined threshold value, the distance determination module 408 may determine a current distance 304 between the vehicle 202 and a transition 302 to the bridge 300. The speed calculation module 410 may then calculate a safe speed at which the vehicle 202 may traverse the bridge 300 under the current conditions. Both the distance 304 determined by the distance determination module 408 and the speed calculated by the speed calculation module 410 may be used by the speed reduction module 412 to determine the rate at which the vehicle 202 speed may be reduced. The rate may be calculated to allow the vehicle 202 to reach the calculated speed by the time it reaches the transition 302 to the bridge 300.

The speed reduction module 412 may apply the rate to slow the vehicle 202 to the calculated speed by the time the vehicle 202 reaches the bridge 300. In one embodiment, the speed reduction module 412 may bring the vehicle 202 to a complete stop in response to extreme conditions as indicated by data from the sensors 210a-e, where there is a very low likelihood that the bridge 300 may be safely traversed.

In some embodiments, the longitudinal slip of the vehicle 202 as it traverses the bridge 300 may provide a good metric of the level of safety associated therewith. This information may be useful to allow adjustments to be made to the vehicle 202 speed and other driving parameters to correct any slippage. To this end, the slip calculation module 414 may calculate the longitudinal slip of the vehicle 202 as a percentage of the difference between the vehicle 202 road surface speed and the wheel speed between axis and roadway surface 212, thus: $slip=(\omega r-v)/v$, where $\omega$ is the lateral component of the rotational speed of the wheel, r is the wheel radius at a point of contact, and v is vehicle speed. A positive slip indicates that the wheels are spinning; a negative slip indicates that they are skidding. Ideally, when there is no slipping or skidding, $\omega r=v$.

In some embodiments, the slip calculation module 414 may continue to calculate the vehicle's 202 longitudinal slip at regular or arbitrary incremental time intervals to provide substantially continuous monitoring of the vehicle 202 as it traverses the bridge 300, and to allow for remedial measures in case of slippage.

The slip threshold module 416 may receive the slip calculation value from the slip calculation module 414 and compare it to a predetermined threshold. As discussed above, the predetermined threshold value may be set at zero ("0") such that a positive slip calculation value indicates that the wheels are spinning, and a negative slip calculation value indicates that the wheels are skidding. If the slip threshold module 416 determines that the slip calculation value does not equal the predetermined threshold value, the speed reduction module 412 may continue to reduce the vehicle 202 speed such that the vehicle 202 may regain traction with the roadway surface 212 of the bridge 300.

The end of bridge detection module 418 may receive data from the on-board sensors 210a-e to determine when the vehicle 202 has finished traversing the bridge 300. For example, data from the navigational system sensors 210d may indicate that the vehicle 202 has reached a location that is beyond the bridge 300, while radar sensors 210b and Lidar sensors 210c may provide data showing a surrounding environment consistent with a grounded roadway surface 212. Data from optical sensors 210a may provide image data confirming the end of the bridge 300. When the vehicle 202 reaches the end of the bridge 300, the end of bridge detection module 418 may cause operation of the icy bridge traversal module 208 to end.

Figure 5:
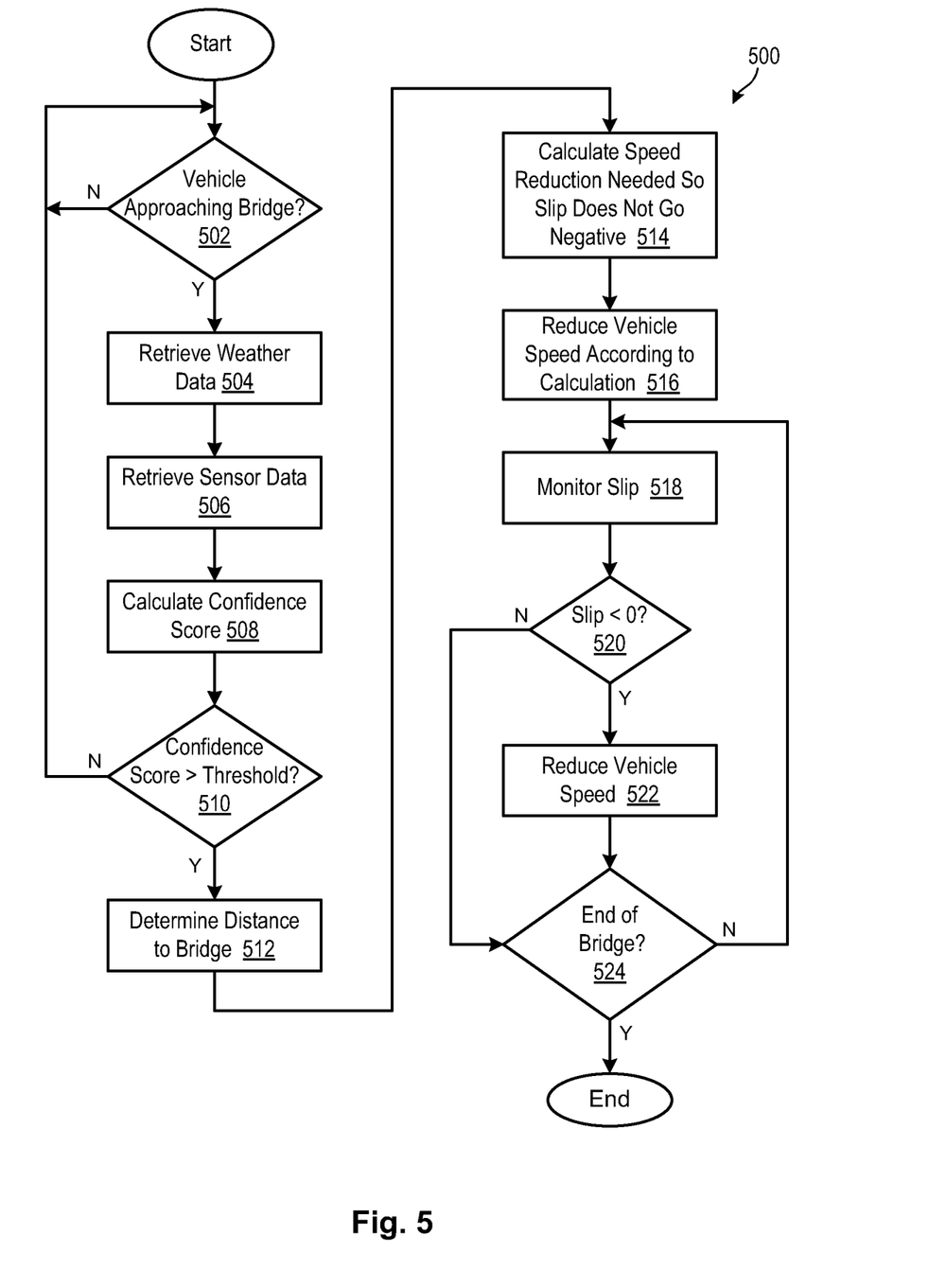
FIG. 5 is a flow chart showing a process for detecting and safely traversing an accumulation of ice on an impending bridge in accordance with certain embodiments of the invention.

Referring now to FIG. 5, one embodiment of a method 500 for assisting a vehicle 202 in traversing an icy bridge 300 is illustrated. As shown, the method 500 initially determines 502 whether the vehicle 202 is approaching a bridge 300. This may be accomplished by determining the location of the vehicle 202 and comparing the location with the location of bridges 300 in map data stored on the vehicle 202 or provided from an external source such as a cloud 204 server. Alternatively, sensors 210a-e on the vehicle 202 may detect when the vehicle 202 is approaching 502 a bridge 300.

Upon approaching a bridge 300, a vehicle 202 may retrieve various types of data to determine whether the bridge 300 is icy. For example, the vehicle 202 may retrieve 504 weather data, such as a weather report, to determine whether conditions are such to create a high probability that there is an accumulation of ice on the bridge 300. Alternatively or additionally, the vehicle 202 may detect weather conditions using 506 its own sensors 210a-e such as temperature sensors, humidity sensors, wind sensors, ice sensors, and/or the like. The vehicle 202 may also detect icy conditions on the bridge 300 using vehicle 202 sensors 210a-e such as optical sensors 210a, radar sensors 210b, Lidar sensors 210c, and the like.

Using the data retrieved at steps 504, 506, the vehicle 202 may calculate 508 a confidence score. This confidence score may represent a probability that ice has accumulated on the bridge 300. In some embodiments, the confidence score may be compared 510 to a predetermined threshold value. If the confidence score is less than the threshold value, the method 500 may return to monitoring 502 whether the vehicle 202 is approaching a bridge 300. A confidence score greater than the threshold value may provide substantial evidence that there is an accumulation of ice or snow on the bridge 300 and the method 500 may continue.

In response to a confidence score greater than a predetermined threshold value, the vehicle 202 may determine 512 the distance to the bridge 300 using the map data previously discussed and/or using the vehicle's 202 sensors 210a-e such as optical sensors 210a, radar sensors 210b, Lidar sensors 210c, or the like. In certain embodiments, this distance is the distance to the bridge 300 along the traveled route as opposed to a straight-line distance. Using this distance, the vehicle computing system 206 may calculate 514 a speed reduction needed to reduce the speed of the vehicle 202 to a safe level by the time it reaches the bridge 300. This speed reduction may be calculated to ensure that the slip of the vehicle 202 does not go negative. Other factors, such as the slope or grade of the roadway surface 212 approaching the bridge 300 may be taken into account when calculating a safe speed reduction. The vehicle computing system 206 may then reduce 516 the vehicle 202 speed according to the calculation performed at step 514. Ideally, this will enable the vehicle 202 to achieve a safe speed by the time it arrives at the bridge 300.

While crossing over the bridge 300, the vehicle 202 may monitor 518 the slip of the vehicle 202 and determine 520 whether the slip goes negative. A negative slip will indicate that the wheels are sliding. If the slip is negative, the vehicle computing system 206 may further reduce 522 the speed of the vehicle 202 until the slip is non-negative. The vehicle 202 may then determine 524 whether the end of the bridge 300 has been reached. If not, the vehicle 202 may repeat the steps 518, 520, 522 until the end of the bridge 300 is reached. When the end of the bridge 300 is reached, the method 500 ends.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
   automatically identifying, by a vehicle, an impending traversal of the vehicle over a bridge;
   sensing, at the vehicle, at least one condition indicating an accumulation of ice on the bridge;
   calculating a speed of the vehicle needed to prevent longitudinal slip between the vehicle and the bridge; and automatically slowing the vehicle at a rate sufficient to enable the vehicle to reach the calculated speed by the time it reaches the bridge.

2. The method of claim 1, wherein identifying the impending traversal further comprises using a global positioning system to determine a traveled route of the vehicle and a location of the vehicle on the traveled route.

3. The method of claim 2, wherein identifying the impending traversal further comprises determining, using map data, a location of the bridge on the traveled route.

4. The method of claim 3, wherein identifying the impending traversal further comprises determining a distance to the bridge by comparing the location of the vehicle to the location of the bridge along the traveled route.

5. The method of claim 2, further comprising automatically obtaining, by the vehicle, at least one of a current and historical weather report for a geographical area in which the bridge is located.

6. The method of claim 1, wherein sensing comprises sensing using at least one sensor selected from the group consisting of an optical sensor, a radar sensor, a Lidar sensor, and a navigational system sensor.

7. The method of claim 6, wherein sensing at least one condition indicating an accumulation of ice on the bridge further comprises calculating, using data from the at least one sensor, a confidence score indicating a likelihood that ice has accumulated on the bridge.

8. The method of claim 1, wherein preventing longitudinal slip between the vehicle and the bridge comprises calculating a current longitudinal slip of the vehicle.

9. The method of claim 8, wherein preventing longitudinal slip between the vehicle and the bridge comprises preventing, as much as possible, the current longitudinal slip from going negative.

10. The method of claim 1, wherein preventing longitudinal slip between the vehicle and the bridge comprises taking into account slope of a road surface between the vehicle and the bridge.

11. A system for traversing an accumulation of ice on an impending bridge, the system comprising:
   at least one processor hosted by a vehicle; and
   at least one memory device operably coupled to the at least one processor and storing instructions for execution on the at least one processor, the instructions causing the at least one processor to:
      automatically identify impending traversal of the vehicle over a bridge;
      sense at least one condition indicating an accumulation of ice on the bridge;
      calculate a speed of the vehicle needed to prevent longitudinal slip between the vehicle and the bridge; and
      automatically slow the vehicle at a rate sufficient to enable the vehicle to reach the calculated speed by the time it reaches the bridge.

12. The system of claim 11, wherein identifying the impending traversal further comprises using a global positioning system to determine a traveled route of the vehicle and a location of the vehicle on the traveled route.

13. The system of claim 12, wherein identifying the impending traversal further comprises determining, using map data, a location of the bridge on the traveled route.

14. The system of claim 13, wherein identifying the impending traversal further comprises determining a distance to the bridge by comparing the location of the vehicle to the location of the bridge along the traveled route.

15. The system of claim 12, wherein the instructions further cause the at least one processor to automatically obtain at least one of a current and historical weather report for a geographical area in which the bridge is located.

16. The system of claim 11, wherein sensing comprises sensing using at least one sensor selected from the group consisting of an optical sensor, a radar sensor, a Lidar sensor, and a navigational system sensor.

17. The system of claim 16, wherein sensing at least one condition indicating an accumulation of ice on the bridge further comprises calculating, using data from the at least one sensor, a confidence score indicating a likelihood that ice has accumulated on the bridge.

18. The system of claim 11, wherein preventing longitudinal slip between the vehicle and the bridge comprises calculating a current longitudinal slip of the vehicle.

19. The system of claim 18, wherein preventing longitudinal slip between the vehicle and the bridge comprises preventing, as much as possible, the current longitudinal slip from going negative.

20. The system of claim 11, wherein preventing longitudinal slip between the vehicle and the bridge comprises taking into account slope of a road surface between the vehicle and the bridge.

* * * * *